US009109164B2

(12) United States Patent
Cheung et al.

(10) Patent No.: US 9,109,164 B2
(45) Date of Patent: Aug. 18, 2015

(54) FIRE RESISTANT GLAZING

(75) Inventors: Angela Yuk Fungt Cheung, Newton-le-Willows (GB); Karikath Sukumar Varma, Southport (GB); David William Holden, Wigan (GB); John Richard Holland, Ormskirk (GB); Stephen Ian Bond, Warrington (GB)

(73) Assignee: Pilkington Group Limited, St. Helens (GB)

( * ) Notice: Subject to any disclaimer, the term of this patent is extended or adjusted under 35 U.S.C. 154(b) by 73 days.

(21) Appl. No.: 13/261,262

(22) PCT Filed: Oct. 12, 2010

(86) PCT No.: PCT/GB2010/051720
§ 371 (c)(1),
(2), (4) Date: Apr. 12, 2012

(87) PCT Pub. No.: WO2011/045597
PCT Pub. Date: Apr. 21, 2011

(65) Prior Publication Data
US 2012/0208921 A1 Aug. 16, 2012

(30) Foreign Application Priority Data
Oct. 13, 2009 (GB) .................................. 0917905.2

(51) Int. Cl.
*B05D 3/02* (2006.01)
*C09K 21/02* (2006.01)
*B32B 17/06* (2006.01)

(52) U.S. Cl.
CPC ............... *C09K 21/02* (2013.01); *B32B 17/069* (2013.01)

(58) Field of Classification Search
CPC .............................. C09K 21/02; B32B 17/069
USPC ........ 523/179; 428/428, 332, 429; 427/389.7; 156/99
See application file for complete search history.

(56) References Cited

U.S. PATENT DOCUMENTS

| 5,061,748 | A | | 10/1991 | Bolton et al. | |
|---|---|---|---|---|---|
| 5,437,902 | A | | 8/1995 | Itoh et al. | |
| 5,565,273 | A | * | 10/1996 | Egli et al. | 428/426 |
| 6,159,606 | A | * | 12/2000 | Gelderie et al. | 428/426 |
| 6,379,825 | B1 | | 4/2002 | Goelff et al. | |
| 2011/0045280 | A1 | * | 2/2011 | Varma et al. | 428/332 |
| 2011/0183145 | A1 | | 7/2011 | Varma et al. | |
| 2012/0061008 | A1 | | 3/2012 | Varma et al. | |

FOREIGN PATENT DOCUMENTS

| EP | 0 192 249 A2 | 8/1986 |
|---|---|---|
| EP | 0 542 022 A1 | 5/1993 |
| EP | 0 590 978 A1 | 4/1994 |
| EP | 0 620 781 B1 | 5/1999 |
| EP | 1 997 622 A1 | 12/2008 |
| EP | 2 014 740 A1 | 1/2009 |
| EP | 2 130 673 A1 | 12/2009 |
| GB | 2 329 389 A | 3/1999 |
| WO | WO 99/19421 A1 | 4/1999 |
| WO | WO 2006/087121 A1 | 8/2006 |
| WO | WO 2007/118885 A1 | 10/2007 |
| WO | WO 2008/053247 A1 | 5/2008 |
| WO | WO 2008/154992 A1 | 12/2008 |

* cited by examiner

*Primary Examiner* — Kriellion Sanders
(74) *Attorney, Agent, or Firm* — Marshall & Melhorn, LLC

(57) ABSTRACT

A transparent fire resistant glazing comprising an intumescent interlayer, wherein the intumescent interlayer comprises an alkali metal silicate and a foam improvement additive, wherein the foam improvement additive comprises a polymer and/or oligomer and/or salts thereof, wherein said polymer, oligomer and/or salts thereof each contain at least one organic moiety having at least one hydrogen-bondable functional group covalently attached thereto.

17 Claims, 6 Drawing Sheets

FIRE RESISTANT GLAZING

This invention relates to fire resistant glazings, to aqueous solutions suitable for producing interlayers for such glazings and to processes for the production of fire resistant glazings.

Fire resistant glazings generally comprise laminated structures having at least two transparent panes and at least one fire resistant interlayer. The transparent panes are normally glass panes although other transparent materials including plastics such as polycarbonates may be used. The interlayer must ideally be optically clear and must remain clear without discolouration throughout the lifetime of the glazing. It must also function so as to improve the fire resistance of the glazing.

EP-A-590 978 describes a process for the production of a fire resistant glass wherein the interlayer comprising an aqueous gel comprising an acrylamide polymer and a particulate metal oxide is produced by introducing a dispersion comprising an acrylamide precursor, the particulate metal oxide and a photopolymerisation initiator between the glass panes and irradiating the dispersion thereby polymerising the precursors. Unfortunately, these products are commercially unattractive owing to the thick layers needed.

In many countries regulations exist specifying the fire resistance to be exhibited by a glazing intended for use in a particular location. Generally these regulations specify either a minimum time for which the glazing must form a barrier to the propagation of a flame when one side of the glazing is exposed to a fire and/or a minimum time for which the temperature and/or the intensity of radiated heat on the side of the glazing which is not exposed to the fire must remain below a specified figure. Unmodified glass panes will not meet any or all of these requirements.

Fire resistant glazings have been developed which comprise laminated glazings having at least one interlayer based upon an alkali metal silicate waterglass between at least two opposed glass panes. These silicate interlayers intumesce upon exposure to heat to form an opaque foam. The foam serves to assist the structure of the glazing and acts as a barrier to radiant heat.

One method for forming a silicate based interlayer is to pour a waterglass solution on to the surface of a glass pane and dry the solution under controlled conditions to form a thin layer on the glass. A second pane may be placed on top of the dried interlayer to form a fire resistant glazing. Such processes (known generally as "pour and dry") are in use in the production of fire resistant glazings such as those sold by the Pilkington Group of companies under its trade marks PYROSTOP and PYRODUR.

A second method of forming a fire resistant glazing comprising a silicate based interlayer is the so called cast-in-place (CIP) method in which a silicate solution is introduced into the space between two opposed panes and cured to form an interlayer. In a cast-in-place process the water content of the solution is generally retained in the cured interlayer. This high water content can absorb significant quantities of heat during a fire and the steam generated causes the intumescence of the interlayer. However, the rate of loss of water is a key factor in governing intumescence uniformity and can cause the structure to fail if it is too rapid. A difficulty inherent in cast-in-place processes is the balance between the need for the solution to have a low enough viscosity to be poured into the space between two opposed glass panes and the need to cure that solution to form an interlayer which is sufficiently rigid to be retained in position through the lifetime of the glazing.

EP-A-620 781 discloses a method for producing a fire resistant glazing comprising a silicate based interlayer using a cast-in-place process and glazings produced by that process. The interlayer is produced by pouring a solution which comprises an alkali metal silicate wherein the molar ratio of silicon dioxide to alkali metal oxide is greater than 4:1 and from at least about 44% to 60% by weight of water between two glass panes. The solution comprises silicic acid as a curing agent. After pouring, the composition is allowed to stand until it self cures to form a polysilicate.

WO-A-2008/154992 discloses an intumescent material useful in fire protection glazings having 6 weight % or less glycerol in the solution used to prepare the intumescent material.

Glycerol can interact with the water in a silicate interlayer to produce smoother quality silicate foam when the intumescent material experiences high temperature. Unfortunately, the quantities of glycerol that are needed to produce the desired effect also result in a detrimental softening of the mechanical properties of the gel material.

EP2014740 speculatively mentions the use of polymers or copolymers as additives but the manner of addition is not exemplified therefore it is not apparent how a transparent product with improved properties would be achieved.

It is an aim of the present invention to overcome the problems of the prior art and to provide a fire resistant glazing with a better quality foam structure (e.g. more uniform and higher density foam during fires) an improved mechanical stability (e.g. reducing the tendency of the interlayer to experience hydrostatic creep) and improved delamination during fires (i.e. where the fire side glass of a fire resistant laminate delaminates cleanly, leaving non-fire glass with an adhered, and usually foamed, interlayer).

The present invention accordingly provides, in a first aspect, a transparent fire resistant glazing comprising an intumescent interlayer, wherein the intumescent interlayer comprises an alkali metal silicate and a foam improvement additive, wherein the foam improvement additive comprises a polymer and/or oligomer and/or salts thereof, wherein said polymer, oligomer and/or salts thereof each contain at least one organic moiety having at least one hydrogen-bondable functional group covalently attached thereto.

In the context of the present invention a foam improvement additive means an additive which improves the foam properties of an alkali silicate upon heating, for example more even and denser foam density. The foam improvement additive is preferably alkali stable (i.e. does not degrade in the presence of alkali).

In the context of the present invention an organic moiety means a part of a molecule, a part of an ion or a part of an ionic compound, which has a carbon basis and may include functional groups as substructures.

In the context of the present invention a hydrogen-bondable functional group means a functional group that is capable of forming a hydrogen bond.

The additive may be an organically-surface modified silica. The surface modification may comprise covalent attachment. Said silica may have multiple hydrogen-bondable groups. The silica may be selected from silicas of various pore sizes, such as non-, micro- and meso-porous. The silica may be a silanol.

The additive may be used in any silicate based interlayer which is useful in the production of fire resistant glazings (whether using a cast-in-place process or a pour and dry process).

The use of a foam improvement additive in accordance with the present invention is advantageous because the presence of the additive in the interlayer results in a slower rate of water/mass loss compared to a similar interlayer without the additive. Furthermore, the presence of the additive results in release of water during fire testing at an even and controlled rate and delamination (resulting in less transmitted heat radiation). Rheology experiments show that additive-containing interlayers are mechanically strong with the potential for less hydrostatic creep. Mechanical adhesion tests have shown that where the interlayer contains additive, the interlayer adheres to the glass strongly. Yet another advantage is that, during a fire test, the presence of an additive results in good delamination (i.e. where the fire side glass to interlayer comes away thereby leaving non-fire glass with interlayer). Previously, it was thought that other additives e.g. fluorosilane coupling agents were needed for delamination properties. The present inventors have discovered that the additives in accordance with the present invention may suffice.

Said additive may be a hydrocolloid. In the context of the present invention a hydrocolloid is defined as a substance capable of being microscopically dispersed or dissolved in an aqueous system. Generally, in a hydrocolloid, the colloid particles spread through water and depending on the quantity of water available, the system can exist as a gel or a liquid. Hydrocolloids may be irreversible (exist in one state i.e. either a gel or a liquid) or reversible (exist as both states i.e. as a gel or a liquid).

Said additive is capable of dispersing (i.e. to form a dispersion) or dissolving (i.e. to form a solution) in aqueous systems.

The additive preferably does not generate haze during or after curing. It is, in any event preferred if the fire resistant glazing is substantially clear.

The additives used in the present invention may be hydrophilic polymers and may themselves be water soluble polymers, for example, polyelectrolytes. Polyelectrolytes are polymers whose repeating units bear an electrolyte group. These groups will dissociate in aqueous solutions (water), making the polymers charged. For example, the sodium salt of poly(acrylic acid), (sodium polyacrylate) dissolves in water to form positive and negative ions. These ions become hydrated by the water molecules. The structure is generally as illustrated schematically in FIG. 1.

Preferably, the additive comprises a polymer network extending through the whole, or at least through a portion, of the interlayer.

The polymer and/or salts thereof may be linear, branched, copolymeric or dendritic. The oligomer and/or salts thereof may be linear, branched, or copolymeric or dendritic. Where the linear or branched polymer and/or oligomer and/or salt thereof is a homopolymer or a dendrimer the molecular weight of the homopolymer or the dendrimer may be up to 5500, preferably less than 5500, more preferably less than 5000, even more preferably less than 4000, most preferably less than 3000.

The additive may be natural or synthetic.

The additive may be selected from the group consisting of dextran, poly(vinyl alcohol), poly(ethylene glycol), gum arabic, carboxymethyl cellulose, poly(acrylic acid), poly(acrylic acid) sodium salt, poly(acrylic acid) potassium salt, poly (acrylic acid) lithium salt, poly(acrylic acid-co-maleic acid), poly(acrylic acid-co-maleic acid) sodium salt, polymethacrylic acid, polymethacrylamide, polyaspartate, alkyl polyglucoside, polyasparagine and their derivatives.

In a preferred embodiment of the present invention, the polymer and/or oligomer and/or salts thereof are generated by in-situ polymerisation. The polymerisation may be activated in substantially any way known to the skilled person for example thermal or photo (preferably U.V.) initiation. The preferred route to polymerisation is thermally initiated polymerisation. This is beneficial because cast-in-place type interlayers in fire resistant glazings often undergo a thermal curing process and so if the polymerisation is thermally initiated it means that polymerisation of the polymer and/or oligomer and/or salts thereof precursor may be performed concurrently without an additional step in the procedure.

Polymerisation to obtain the polymer and/or oligomer and/or salts thereof preferably comprises polymerisation of at least one precursor of formula

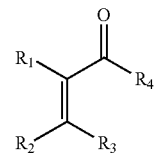

wherein:

$R_1$ and $R_2$, $R_2$ and $R_3$ or $R_3$ and $R_4$ together with the carbons to which they are attached form 5, 6, 7 or 8 membered rings; and/or $R_1$, $R_2$, $R_3$ and $R_4$ are independently selected from hydrogen, halo, pseudohalo, substituted or unsubstituted hydrocarbyl, substituted or unsubstituted heterohydrocarbyl, $OR_5$, $NH_2$, $COOR_5$, ONa, $ONH_4$, OK, OLi, or SH wherein $R_5$ is H, substituted or unsubstituted hydrocarbyl, of which a least one or more of $R_1$ to $R_4$ should carry an ionisable group in alkaline pH conditions, Preferably, $R_2$ and $R_3$ are not simultaneously OH, ONa, OK, OLi, $NR'_n$ (R' is H, substituted or unsubstituted hydrocarbyl), $NH_2$ or SH or any combination of these groups.

Suitable hydrocarbyl groups are alkyl, for example methyl, ethyl, n-propyl, isopropyl, n-butyl, t-butyl, adamantyl; aryl or substituted aryl, for example phenyl, ortho-tolyl, meta-tolyl, para t-tolyl, ethylphenyl, isopropylphenyl, t-butylphenyl, 2,6-dimethylphenyl, 2,4-dimethylphenyl, 3,5-dimethylphenyl, 2,6-diisopropylphenyl, 2,4,6-trimethylphenyl, 2,4,6-triisopropylphenyl, naphthyl, benzyl, alkenyl or alkynl groups. The preferred hydrocarbyl groups are methyl, ethyl, n-propyl, isopropyl, n-butyl, and t-butyl.

Suitable heterohydrocarbyl groups may have one or more heteroatoms and the moiety may be attached through heteroatom or the heteroatom may be at any other possible substituent position on the group. Suitable examples where the heteroatom is attached directly are: $-Z(R_6)_m$ where Z is Si and m is 3, Z is N and m is 2, Z is P and m is 2 or 4, Z is O and m is 1, or Z is S and m is 1; the groups $R_6$ are the same or different hydrocarbyl groups as defined above.

Suitable examples where the heteroatom(s) are in other positions are; $CF_3$, $CF_2CF_3$, $CH_2OMe$, $CH_2NMe_2$, $CH_2CH_2NH_2$, $CH_2CH_2N(R^1)_2$, $CH_2CH_2P(R^1)_2$, $CH_2CH_2CH_2P(R^1)_2$, fluorophenyl, perfluorophenyl, chlorophenyl, bromophenyl, $C_6H_4(CF_3)$, $C_6H_3(CF_3)_2$, $C_6H_4(OMe)$, $C_6H_3(OMe)_2$, $C_6H_4(N(R^1)_2)$, $C_6H_4(P(R^1)_2)$, where $R_6$ is as defined above.

Halo may be any of F, Cl, Br, I, Pseudohalo includes cyanate (OCN), isocyanate (NCO), azido ($N_3$), cyano (CN) and thiocyano (SCN).

Preferably the precursor is a (meth)acrylate or a (meth) acrylamide.

Preferred precursors for use in the present invention may be selected from sodium(meth)acrylate, potassium(meth) acrylate, ammonium(meth)acrylate, (meth)acrylic acid, itaconic acid, maleic acid, (meth)acrylic acid, maleic acid coprecursor, glycerol 1,3-diglycero late di(meth)acrylate, diurethane di(meth)acrylate, 3-(Acryloyloxy)-2-hydroxypropyl(meth)acrylate, and N,N'-(1,2-dihydroxyethylene)bis(meth)acrylamide.

The polymer and/or oligomer and/or salts thereof may be polymerised from a single precursor or from a mixture of precursors.

The alkali metal silicate of the interlayer is preferably an alkali metal silicate having a molar ratio $SiO_2:M_2O$ from 1.5:1 to 6:1 where M represents an alkali metal cation.

The alkali metal silicate may comprise sodium silicate, lithium silicate or potassium silicate or mixtures thereof. If the interlayer comprises sodium silicate, then preferably the molar ratio of $SiO_2:Na_2O$ is from 2.0:1 to 4.0:1.

If the interlayer comprises potassium silicate, then preferably the potassium silicate has a molar ratio of $SiO_2:K_2O$ from 1.4:1 to 2.0:1.

It is preferred if the alkaline metal silicate comprises a mixture of sodium and potassium silicates. In this event, it is preferred if the molar ratio of sodium ions to potassium ions is at least 2:1.

The alkali metal silicate may be formed as a solution by the addition of silica to a solution of an alkali metal silicate or by the addition of an alkali to a dispersion of silica particles. In particular, the alkali metal silicate solutions may be formed by the addition of an aqueous dispersion of silica and alkali metal silicate solution as is described for example in EP 0 620 781 or by homogenising a dispersion of nanoparticulate silica in an aqueous medium comprising a polyol and potassium hydroxide as is described in U.S. Pat. No. 6,479,156. Also the silicate solutions may be produced by combining an organic silica sol with an alkali metal silicate solution.

It is preferred if the total water content of the interlayer is in the range of 20 to 60% by weight. More preferably, the total water content is 25 to 60% by weight, most preferably 30 to 55% by weight. Preferably the total water content is less then 55% and more preferably less than 50% by weight of water. Low water content causes the viscosity of the formulation to increase to a point when the formulation is no longer pourable. The water content of the preferred formulations represents a compromise between the need for the solution to be pourable and the need for the glazing to exhibit the optimum fire resistance.

Generally, the content of the additive in the interlayer is relatively low. It is preferred if the content of the additive in the solution which is to form the interlayer or in the intumescent interlayer is up to 5% by weight, more preferably less than 5% by weight, even more preferably less than 4% by weight, even more preferably less than 2% by weight, even more preferably less than 1% by weight, even more preferably less than 0.7% by weight, even more preferably up to 0.5% by weight, even more preferably less than 0.5% by weight, most preferably less than 0.4% by weight.

The interlayer may also comprise at least one humectant. Said humectant may comprise an organic compound comprising at least one and preferably more than one hydroxyl group as part of its molecular structure. Examples of organic compounds which are preferred for use in the formulations of the present invention include ethylene glycol, propylene glycol, diethylene glycol, polyethylene glycol, trimethylol propane, pentaerythritol, sorbitol, mannitol, sucrose and xylitol.

Compounds such as glycerol act as plasticizers for the interlayer and may usefully be incorporated into interlayers which might otherwise be too brittle to exhibit the desired degree of fire resistance. The interlayer may comprise up to 15% by weight and more preferably from 5 to 10% by weight of glycerol (or ethylene glycol).

Saccharides such as sorbitol, xylitol or mannitol act to bind water in the interlayer and to improve the fire resistance of the glazing. Interlayers may comprise from 5 to 10% by weight of the saccharide.

Fire resistant glazings according to the first aspect of the present invention will generally have an intumescent interlayer as discussed above and at least one glass sheet. Usually, the fire resistant glazings will have one or more interlayers and two or more sheets of glass.

Generally the fire resistant glazing will be an interlayer sandwiched between two sheets of glass. If more than two sheets of glass are required then generally a single interlayer may be sandwiched between two sheets of glass and a further interlayer (whether an intumescent interlayer as discussed above or a polymer interlayer for example of polyvinyl butyral, PVB or ethylene vinyl acetate EVA) may be sandwiched between the glass/intumescent interlayer/glass structure and a third sheet of glass. Preferably, however, any multilayer fire resistant glazings will comprise a number of sheets of glass with an intumescent interlayer sandwiched between any two sheets of glass in the glazing.

The present invention provides in a second aspect, an aqueous solution comprising,
a) an alkali metal silicate,
b) at least one foam improvement additive as discussed above in relation to the first aspect (a polymer and/or oligomer and/or salts thereof, wherein said polymer, oligomer and/or salts thereof each contain at least one organic moiety having at least one hydrogen-bondable functional group covalently attached thereto), and
c) optionally, a thermal- or a photo-initiator (preferably a UV initiator).

In a third aspect, the present invention provides a process for the production of a transparent fire resistant glazing, the process comprising,
a) providing a substrate, preferably a glass substrate,
b) providing an aqueous solution of an alkali metal silicate and at least one precursor,
c) contacting the substrate with the aqueous solution, and
d) polymerising the precursor to form a polymer and/or oligomer and/or salts thereof, wherein said polymer, oligomer and/or salts thereof each contain at least one organic moiety having at least one hydrogen-bondable functional group covalently attached thereto.

A transparent fire resistant glazing according to the invention may be produced (using the cast-in-place process) generally as follows.

An intumescent interlayer is formed between two opposed panes. The panes are normally glass panes, preferably float glass panes having a thickness of from 2.0 to 8.0 mm. The panes may have a heat reflective coating upon at least one surface. One example of a coated glass which may be used is the low emissivity glass sold by the NSG Group under its trade mark Pilkington K GLASS. Preferably the float glass panes are toughened glass panes. The panes may also be formed from borosilicate glasses or from ceramic glasses such as those sold by the Nippon Electric Glass Company under the Trade Mark FIRELITE.

The narrow sides of the cavity may be sealed using a suitable sealant which extends around the perimeter of the panes. The width of the space between the panes is preferably in the range 2 mm to 8 mm, more preferably in the range 3 mm to 6 mm. A solution of alkali metal silicate and either a foam improvement additive as discussed above or more preferably, polymerisable precursors of said additive, is subject to a degassing step and then poured into the cavity through an opening in the sealant. When the cavity is full the opening is closed and the glazing allowed to stand for a sufficient time to cure the formulation. The curing may be accelerated by heating the glazing to a moderate temperature say 50 or 60° C. If polymerisable precursors are present and if a thermal initiator is present then precursors may be concurrently polymerised by the heat treatment. Alternatively, if a photoinitiator is added then an additional step of irradiation to cure the precursors will preferably be used.

In another aspect the present invention provides a fire resistant glazing comprising an intumescent interlayer, wherein the intumescent interlayer comprises an alkali metal silicate and a foam improvement additive, wherein the foam improvement additive comprises a hydrocolloid and/or a water soluble polymer.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

Embodiments of the present invention will now be described with reference to the accompanying drawings in which.

Figure 1:
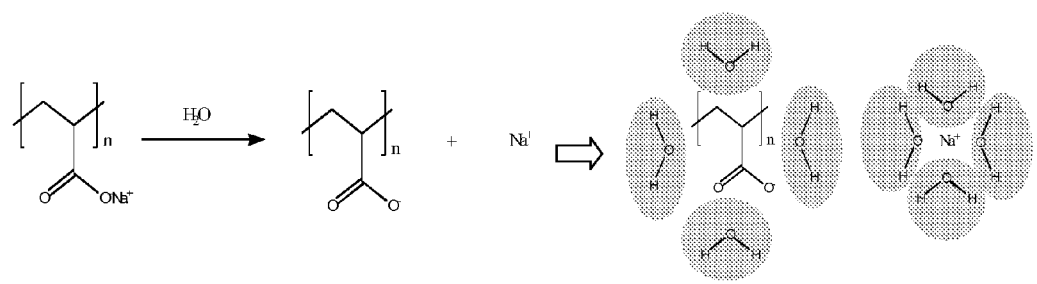
FIG. 1 illustrates schematically the structure of a polyelectrolyte hydrocolloid in water.
Figure 2:
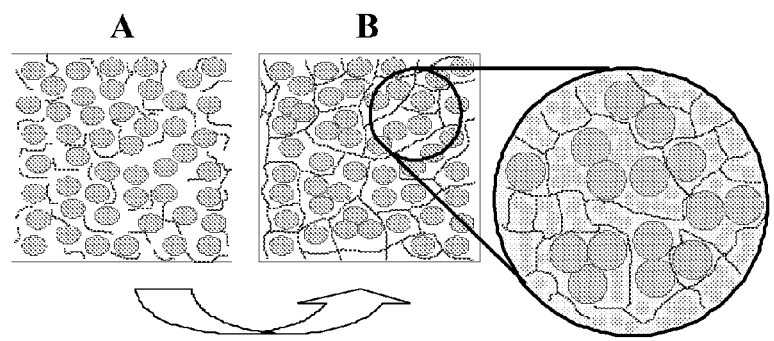
FIG. 2 illustrates schematically the structure of a silicate interlayer with an in-situ polymerised polymer containing at least one organic moiety having at least one hydrogen-bondable functional group covalently attached thereto.

In FIG. 2, A represents silicate with monomer, B represents monomer polymerised in-situ of silicate, and the arrow represents curing with heat and the addition of a thermal initiator.

The invention is further illustrated by the following Examples.

EXAMPLES 1 TO 19

In-Situ Polymerised Hydrocolloids and/or Water Soluble Polymers

In Examples 1 to 19 in-situ polymerised polymers containing at least one organic moiety having at least one hydrogen-bondable functional group covalently attached thereto in intumescent interlayers are produced and compared to interlayers without in-situ polymerised polymers and interlayers with pre-formed polymers containing at least one organic moiety having at least one hydrogen-bondable functional group covalently attached thereto (hydrocolloids) added to the formulation. Precursors of the organic polymers used in the Examples are as described in Table 1.

Table 2 shows the formulations of the additives in the form of salts or precursors polymerised in-situ of potassium silicate solution using a thermal initiator or a photoinitiator. For the formulations that were thermally polymerised, the samples were cured at elevated temperature to form gels or films. For the formulations that were UV polymerised, the samples were cured under a 400 W UV flood lamp for up to 5 minutes.

TABLE 1

Precursors for formation of hydrocolloids.

| A<br>SALTS | B<br>Monomers | C<br>Co-Monomers |
|---|---|---|
| Sodium acrylate | Methacrylic acid | Acrylic acid-co-maleic acid |
| Sodium methacrylate | Acrylic acid | |
| Potassium methacrylate (freeze dried) | Itaconic acid | |

The following basic polymerisation additives were used:
Darocur 1173 (2-hydroxy-2-methylpropiophenone) (UV Initiator)
Potassium persulfate (Thermal initiator)
Thioglycolic acid and formic acid (chain transfer agents)

Table 3 shows the formulations of additives in the form of salts, precursors or coprecursors polymerised in-situ of a mixture of potassium silicate solution and silica sol. The silica sol is added to the potassium silicate solution with stirring at room temperature. This mix was degassed under reduced pressure before adding the additives which were then thermally or UV polymerised in-situ of these potassium silicate solutions.

For Table 2 the following methods (A and B) were used:

Method A

EXAMPLES 1-3 AND 5-7

Sodium acrylate, sodium methacrylate or potassium methacrylate were dissolved in potassium silicate solution. The required amount of UV or thermal initiator was added. The samples were thermally or UV cured in Petri dishes at elevated temperatures or under a 400 W UV flood lamp for 1-5 minutes to form films or gels.

Method B

EXAMPLES 4 AND 8

Methacrylic acid was dissolved in potassium silicate solution. Potassium hydroxide pellets (required amount to neutralize the amount of methacrylic acid) were added to the water or potassium silicate solution prior to adding the methacrylic acid. The required amount of Potassium persulfate was added. The samples were cured in Petri dishes at elevated temperatures to form films.

For Table 3 the following methods (C—F) were used:

Method C

EXAMPLES 8-14

Sodium acrylate, sodium methacrylate, potassium methacrylate, Itaconic acid or methacrylic acid were dissolved in potassium silicate solution. The required amount of UV or thermal initiator and chain transfer agent were added. This was then mixed with silica sol. The samples were thermally or UV cured in glass cells at elevated temperatures or under a 400 W UV flood lamp for 1-5 minutes to form solid interlayers.

Method D

EXAMPLE 15

0.1-0.6% Acrylic acid in Potassium silicate solution were made from a stock solution of 1% acrylic acid in potassium silicate. Potassium hydroxide pellets (required amount to neutralize the amount of acrylic acid) were added to the potassium silicate solution prior to adding the acrylic acid. The required amount of Potassium persulfate and Formic acid solutions were added. These were then mixed with silica sol. The samples were cast into glass cells and cured at elevated temperature to form solid interlayers.

Method E

EXAMPLES 16 AND 17

A degassed solution of silica sol was added to potassium silicate solution with stirring at room temperature. The mixture was degassed under reduced pressure. Equal amounts of acrylic acid and deionised water were mixed together. The required amount of potassium hydroxide pellets to neutralize the acrylic acid was added. This final mix was added to the silica sol and potassium silicate solution mixture. Finally, the required amount of Potassium persulfate and Formic acid solutions were added. The sample was cast into a glass cell and cured at elevated temperature to form a solid interlayer.

Method F

EXAMPLE 18 AND 19

Equal amounts of acrylic acid and deionised water were mixed together. Sufficient potassium hydroxide pellets to neutralize the acrylic acid was added. This mix was added to potassium silicate solution and then degassed. A degassed solution of silica sol was added to the potassium silicate solution with stirring at room temperature. Water was removed to the desired water content. The mixture was degassed under reduced pressure. Finally, the required amount of Potassium persulfate solution was added. The sample was cast into a glass cell and cured at elevated temperature to form a solid interlayer.

TABLE 2

Salts or Precursors thermally or UV polymerised in-situ of water or potassium silicate solutions in which the molar ratio of $SiO_2:K_2O$ was 1.43 and gels or films were formed. % contents are given as weight %.

| Example No | Additive dissolved in | Additive (Salt/Monomer) | Additive Content % | Potassium persulfate initiator % | Darocur 1173 Initiator Content % [1]Darocur 1173 dissolved in methanol [2]Darocur 1173 dissolved in ethylene glycol | Appearance of film or gel |
|---|---|---|---|---|---|---|
| 1 | Potassium silicate | Sodium acrylate | 2-5 | | 0.5[1] | Clear films |
| 2 | Potassium silicate | Sodium acrylate | 2-5 | | 0.5[2] | Clear films |
| 3 | Potassium silicate | Sodium methacrylate | 5 | | 0.5[1] | Hazy film |
| 4 | Potassium silicate | Methacrylic acid | 1 | 0.5 | | Clear gel |
| 5 | Potassium silicate | Sodium methacrylate | 0.1 | 0.5 | | Clear gel |
| 6 | Potassium silicate | Potassium methacrylate | 0.1 | 0.5 | | Clear film |
| 7 | Potassium silicate | Sodium acrylate | 0.1-1.0 | 0.5 | | Clear films |
| 8 | Potassium silicate | Methacrylic acid | 0.1-3.0 | 1.0 | | Clear films |

TABLE 3

Potassium silicate solutions were made up by adding an aqueous silica sol comprising 50% by weight of silica having an average particle size of 50 nm to a potassium silicate solution in which the molar ratio of $SiO_2:K_2O$ was 1.43. The additives in the form of salts, precursors or coprecursors were thermally or UV polymerised in-situ of these solutions. % contents are given as weight %.

| Example No | Molar ratio $SiO_2:K_2O$ | Additive (Salt/Monomer/ Comonomers) | Additive Content % | Total Water Content % | Darocur 1173 dissolved in ethylene glycol % | Potassium persulfate Initiator Content % | Formic acid or Thioglycolic acid Chain Transfer Agent % | Appearance of Interlayer | Experimental Results | | |
|---|---|---|---|---|---|---|---|---|---|---|---|
| | | | | | | | | | TGA | Fire Test | Rheology |
| 9 | 4.7 | Sodium acrylate | 5 | 48.5 | 0.5 | | | Hazy | | | |
| 10 | 4.7 | Potassium methacrylate | 0.1 | 48.5 | | 1.0 | 0.1- Thioglycolic acid | Clear | | | |
| 11 | 4.7 | Itaconic acid | 0.1-0.3 | 48.5 | | | | Clear | | | |
| 12 | 4.7 | Sodium methacrylate | 0.1 | 48.5 | | 0.5 | | Clear | | | |
| 13 | 4.7 | Potassium methacrylate | 0.1 | 48.5 | | 0.5 | | Clear | | | |
| 14 | 4.7 | Methacrylic acid | 0.1 | 48.5 | | 1.0 | | Clear | | | |
| 15 | 4.7 | Acrylic acid | 0.1-0.6 | 48.6-48.7 | | 1.0 | 0.75- Formic acid | Clear | 1 | 2 | 3 |
| 16 | 4.7 | Acrylic acid | 0.2-0.4 | 48.5 | | 1.0 | | Clear | 1 | 2 | 3 |

TABLE 3-continued

Potassium silicate solutions were made up by adding an aqueous silica sol comprising 50% by weight of silica having an average particle size of 50 nm to a potassium silicate solution in which the molar ratio of $SiO_2:K_2O$ was 1.43. The additives in the form of salts, precursors or coprecursors were thermally or UV polymerised in-situ of these solutions. % contents are given as weight %.

| Example No | Molar ratio $SiO_2:K_2O$ | Additive (Salt/Monomer/ Comonomers) | Additive Content % | Total Water Content % | Darcour 1173 dissolved in ethylene glycol % | Potassium persulfate Initiator Content % | Formic acid or Thioglycolic acid Chain Transfer Agent % | Appearance of Interlayer | Experimental Results | | |
|---|---|---|---|---|---|---|---|---|---|---|---|
| | | | | | | | | | TGA | Fire Test | Rheology |
| 17 | 4.7 | Acrylic acid and Maleic acid | 0.5 | 48.5 | | 1.0 | | Clear | 1 | | 3 |
| 18 | 5.3 | Acrylic acid | 0.1-0.237 | 41.3 | | 1.0 | | Clear | 1 | 2 | 3 |
| 19 | 5.3 | Acrylic acid and Maleic acid | 0.1-0.2 | 41.5-41.7 | | 1.0 | | Clear | 1 | | 3 |

Figure 3:
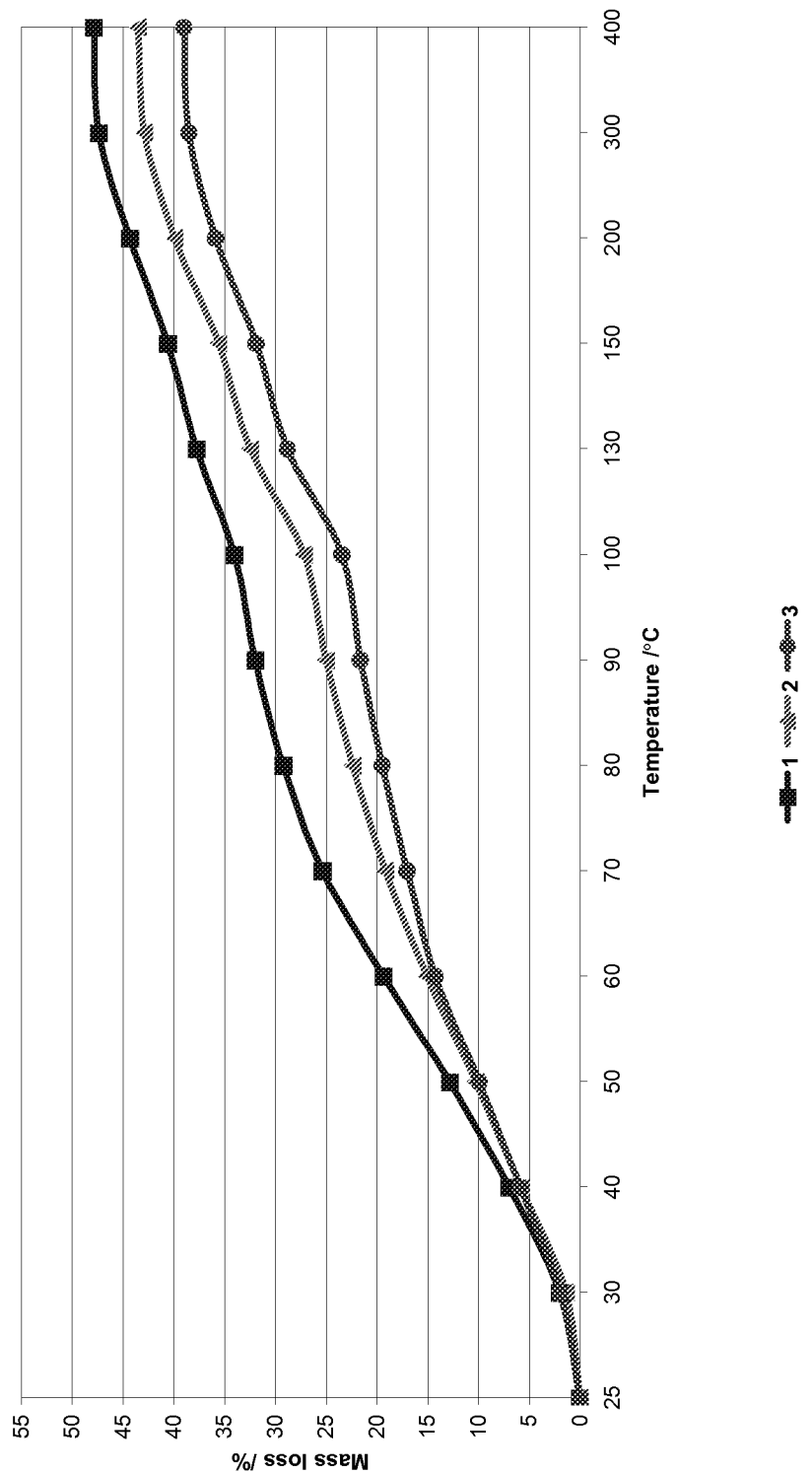
FIG. 3 is a graph of the results of thermal analysis for samples, discussed in the Examples, below.

[1]Low mass loss, retained water for longer compared to a sample in the absence of additive
[2]Low transmitted radiation values indicating the additives are binding water more effectively than a sample in the absence of additive
[3]Interlayers have high mechanical strength indicating that the additives bind water more effectively than a sample in the absence of additive Thermal Analysis Thermal gravimetric analysis was conducted on cured interlayers. FIG. 3 is a graph of the results of thermal analysis of polymers/additives in potassium silicate solution and silica sol. FIG. 3 illustrates the mass loss (rate of water loss) of acrylic acid (0.4% wt present in the interlayer) in Potassium silicate solution mixed with silica sol (plot 3) and of a mix of Acrylic acid and Maleic acid (1:0.5 mole ratio, 0.5% wt present in the interlayer) in Potassium silicate solution mixed with silica sol (plot 2) and also of Standard (Potassium silicate solution and silica sol only) (plot 1). Both the additive samples were polymerised in-situ by adding the thermal initiator potassium persulfate. Both the additive samples have considerably less mass loss than the Standard sample at a temperature of 400° C. The Acrylic acid sample has the least mass loss. The samples with additives retain water for longer hence controlling the foaming rate and other foam characteristics, hence confirming the functional usefulness of these novel additives.

Fire Testing

Figure 4:
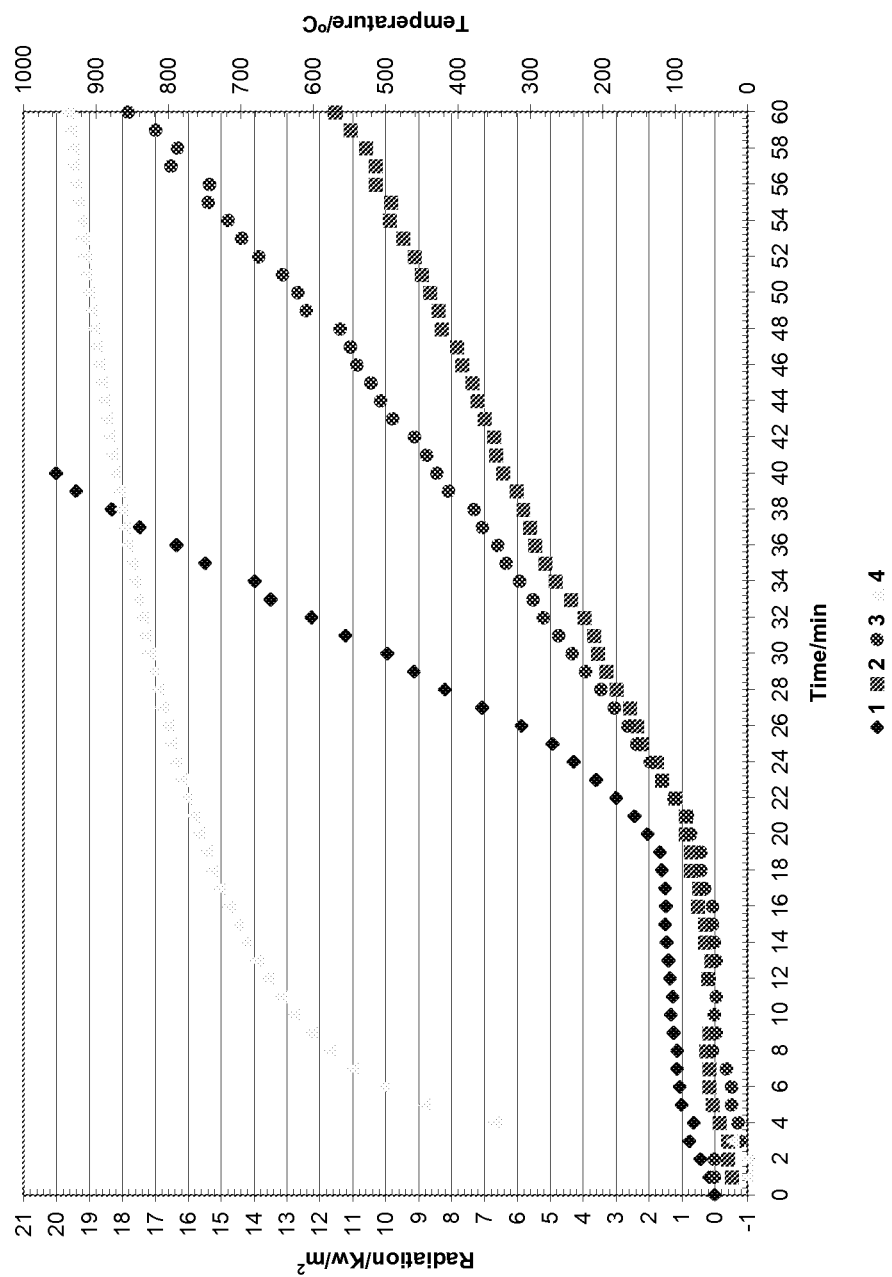
FIG. 4 is a graph of transmitted radiant heat of samples during fire testing, discussed in the Examples, below.

FIG. 4 shows the fire test results (comparative thermal radiation transmission data) of the Standard (Potassium silicate solution and silica sol only) (plot 1), of Acrylic acid (0.4% wt present in the interlayer) polymerised in-situ of Potassium silicate solution mixed with silica sol (plot 2) and of Poly(acrylic acid), sodium salt (0.1% wt present in the interlayer MW 5,100) in Potassium silicate solution mixed with silica sol (plot 3). Plot 4 represents the temperature during the tests. Both the acrylic acid and poly(acrylic acid), sodium salt samples have lower transmitted radiation ($T_{rad}$) values than the Standard sample, with the Acrylic acid sample having the lowest $T_{rad}$ values. This graph shows that polymerising acrylic acid in-situ of the Potassium silicate solution and silica sol mixture is even more effective in binding water than if an 'off the shelf' product such as Poly(acrylic acid), sodium or potassium salt, is used.

Further fire tests were conducted on a large scale. Acrylic acid (0.2% wt present in the interlayer) was polymerised in-situ of a cast-in-place formulation containing 41% wt water in glass cells made with a thermoplastic spacer and 5 mm toughened glass. The glass cells were 2.3×1.2 m, and of 4 mm and 5 mm thicknesses. Each thickness was tested in two different orientations; top glass and bottom glass to see if polymer has migrated to the top or bottom surface between the interlayer and the glass. All samples delaminated well and passed [up to 75 minutes] according to EN 1363-1. The samples performed the same whether top glass or bottom glass faced the fire. The glass facing the fire had delaminated cleanly leaving a uniform and intumescent foam with a flat surface indicating that there is a thin layer of polymer between the glass and the interlayer. Surface analyses using FTIR (Fourier transform Infra-red spectroscopy) and SEM-EDS (Scanning electron microscopy (SEM) and Energy Dispersive Spectroscopy (EDS)) has confirmed the presence of a thin film of polymer.

Rheology

Rheology experiments have been conducted on solid samples of interlayers with and without additives:

Standard (Potassium silicate solution and silica sol only)
0.4% wt Sodium polyaspartate in Potassium silicate solution mixed with silica sol.
A mix of 0.5% wt Acrylic acid and Maleic acid (1:0.5 mole ratio) (polymerised in-situ by adding 1% wt potassium persulfate thermal initiator) in Potassium silicate solution mixed with silica sol
0.4% wt Glucopon (alkyl polyglucoside) in Potassium silicate solution mixed with silica sol Table 4 shows some viscosity values obtained from the rheology experiments. It indicates the tendency for 'hydrostatic creep' and it can be seen that the samples with additives are better in this regard.

TABLE 4

Viscosity values of various additives within cast-in-place interlayers.

| Additive | Viscosity/ Pa · s |
|---|---|
| Standard | 6.50E+06 |
| Sodium polyaspartate | 8.00E+06 |
| Acrylic acid and Maleic acid | 2.00E+07 |
| Glucopon | 3.50E+07 |

Mechanical Adhesion Tests

Mechanical adhesion tests were conducted on interlayer material samples with and without in situ polymerised acrylic acid (0.2% wt) using an Instron 5500R universal test machine at room temperature. Tables 5 and 6 show that adhesion of interlayer to glass is slightly stronger when acrylic acid is present, also the load per unit area for each sample is consistent with each other. The load per unit area for the non acrylic acid samples vary from sample to sample.

TABLE 5

Mechanical adhesion tests of cast-in-place samples with no acrylic acid.
Without acrylic acid

| Sample No. | Average diameter (mm) | Area (mm$^2$) | Load (N) | Load/unit area (Nmm$^{-2}$) |
|---|---|---|---|---|
| No 1 | 34.5 | 934.8 | 824.2 | 0.88 |
| No 2 | 35.0 | 962.1 | 1163.0 | 1.21 |
| No 3 | 37.0 | 1075.2 | 708.7 | 0.66 |
| Average | 35.5 | 990.7 | 898.6 | 0.92 |

TABLE 6

Mechanical adhesion tests of cast-in-place samples with acrylic acid polymerised.
With acrylic acid

| Sample No. | Average diameter (mm) | Area (mm$^2$) | Load (N) | Load/unit area (Nmm$^{-2}$) |
|---|---|---|---|---|
| No 1 | 35.5 | 989.8 | 1409.7 | 1.42 |
| No 2 | 37.5 | 1104.5 | 1505.2 | 1.36 |
| No 3 | 36.5 | 1046.3 | 1261.6 | 1.21 |
| Average | 36.5 | 1046.9 | 1392.2 | 1.33 |

Thermal analysis shows that polymerizing precursors in-situ to form polymers in the interlayer results in a slower rate of water/mass loss compared to an interlayer without any polymers. The polymers are binding water much more strongly than if no polymer is present. This indicates that the movement or diffusivity of water within the interlayer during a fire is more controlled leading to a more uniform foam (better foam characteristics). In-situ polymerisation also appears to give better results than adding polymers to the interlayer formulation.

Fire tests have showed that in-situ polymerised precursors hold onto water and release water at an even more controlled rate compared to where a polymer has been directly added to the formulation. The in-situ polymerisation of precursors in the interlayer have also resulted in good delamination during a fire, leaving all the intumescent foam intact and not taking any away. This means there is less heat radiation compared to that with no polymer present.

Rheology experiments have shown that the samples with acrylic acid polymerised in-situ are mechanically stronger than a sample without acrylic acid. The acrylic acid samples are binding water more effectively.

The additive containing samples (sodium polyaspartate and coprecursors of acrylic acid and maleic acid) have higher crossover moduli (G') values meaning connectivity is stronger. A stronger network means that water would be held in the polymer network strongly and that there will be less 'hydrostatic creep'. The additive containing samples have higher zero shear viscosity values meaning they are mechanically more robust relative to standard samples with no additives.

Mechanical adhesion tests have shown that in samples containing polymerised acrylic acid, the interlayer adheres to the glass stronger than if no acrylic acid was present.

EXAMPLES 20 TO 38

Foam Improvement Additives Used without In-Situ Polymerisation

TABLE 7

Foam improvement additives that gave clear interlayers/samples.
ADDITIVE TYPE

| A<br>Polycarboxyls or Polyhydroxyls or their salts | B<br>Polysaccharides |
|---|---|
| Sodium polyaspartate | Glucopon 215 (alkyl polyglucoside) |
| Poly(acrylic acid) (mwt 2,000) | Glucopon 215 and Poly(acrylic acid), sodium salt (molecular weight of 5,100) blend |
| Poly(acrylic acid), sodium salt (mwt 2,100) | |
| Poly(acrylic acid), sodium salt (mwt 5,100) | |
| Freeze dried Potassium polyacrylate synthesised from Potassium hydroxide (1M) and Poly(acrylic acid) (mwt 2,000) | |
| Freeze dried Potassium polyacrylate synthesised from Potassium hydroxide (1M) and Poly(acrylic acid) (mwt 230,000) | |
| Freeze dried Lithium polyacrylate synthesised from Potassium hydroxide (1M) and Poly(acrylic acid) (mwt 2,000) | |
| Poly(acrylic acid-co-maleic acid) (50% solution, mwt of 3,000) | |
| Poly(acrylic acid-co-maleic acid), sodium salt (mwt 50,000) | |
| PAMAM-OH Dendrimers | |

Table 8 describes the formulations containing the foam improvement additives in potassium silicate solutions (molar ratio of SiO$_2$:K$_2$O of 1.43) which are then mixed with silica sol (comprising 50% by weight of silica and having a particle size of 50 nm) giving a final molar ratio of SiO$_2$:K$_2$O of 1.43. The water content is ~48%.

As can be seen, higher molecular weight (e.g. greater than 5500 MW) homopolymers do not exhibit as much transparency as higher molecular weight copolymers. This is due to the fact that higher molecular weight homopolymers are more likely to induce phase separation and light scattering.

The following methods were used to make the samples shown in Table 8:

Method A

EXAMPLE 20-36

An additive (selected from sodium polyaspartate, poly(acrylic acid), sodium salt, Poly(acrylic acid), Poly(acrylic acid), sodium salt, synthesised potassium polyacrylate, synthesised lithium polyacrylate, poly(acrylic acid-co-maleic acid), poly(acrylic acid-co-maleic acid), sodium salt, poly(diallyldimethylammoniumchloride), Glucopon 215, Glucopon 215 and poly(acrylic acid), sodium salt blends) was dissolved in potassium silicate solution. The potassium silicate solution mix was degassed. Degassed silica sol was added to the water-soluble polymer/hydrocolloid and potassium silicate solution mix. The final mixture was degassed under reduced pressure. The sample was then cast into glass cells and cured at elevated temperature to form a solid interlayer.

Method B

EXAMPLE 37

Dispelair BS735 (an anti-foam reagent based on an emulsion of polydimethyl siloxane) was mixed into Glucopon 215 before mixing with a degassed potassium silicate solution. Degassed silica sol was then added to this mix. The final mixture was degassed under reduced pressure. The sample was then cast into glass cells and cured at elevated temperature to form a solid interlayer.

Method C

EXAMPLE 38

PAMAM-OH dendrimer in methanol was added to silica sol. The methanol was removed by evaporation prior to degassing the silica sol. This mixture was then added to a degassed potassium silicate solution. The final mixture was degassed under reduced pressure. The sample was then cast into glass cells and cured at elevated temperature to form a solid interlayer.

Thermal Analysis

Figure 5:
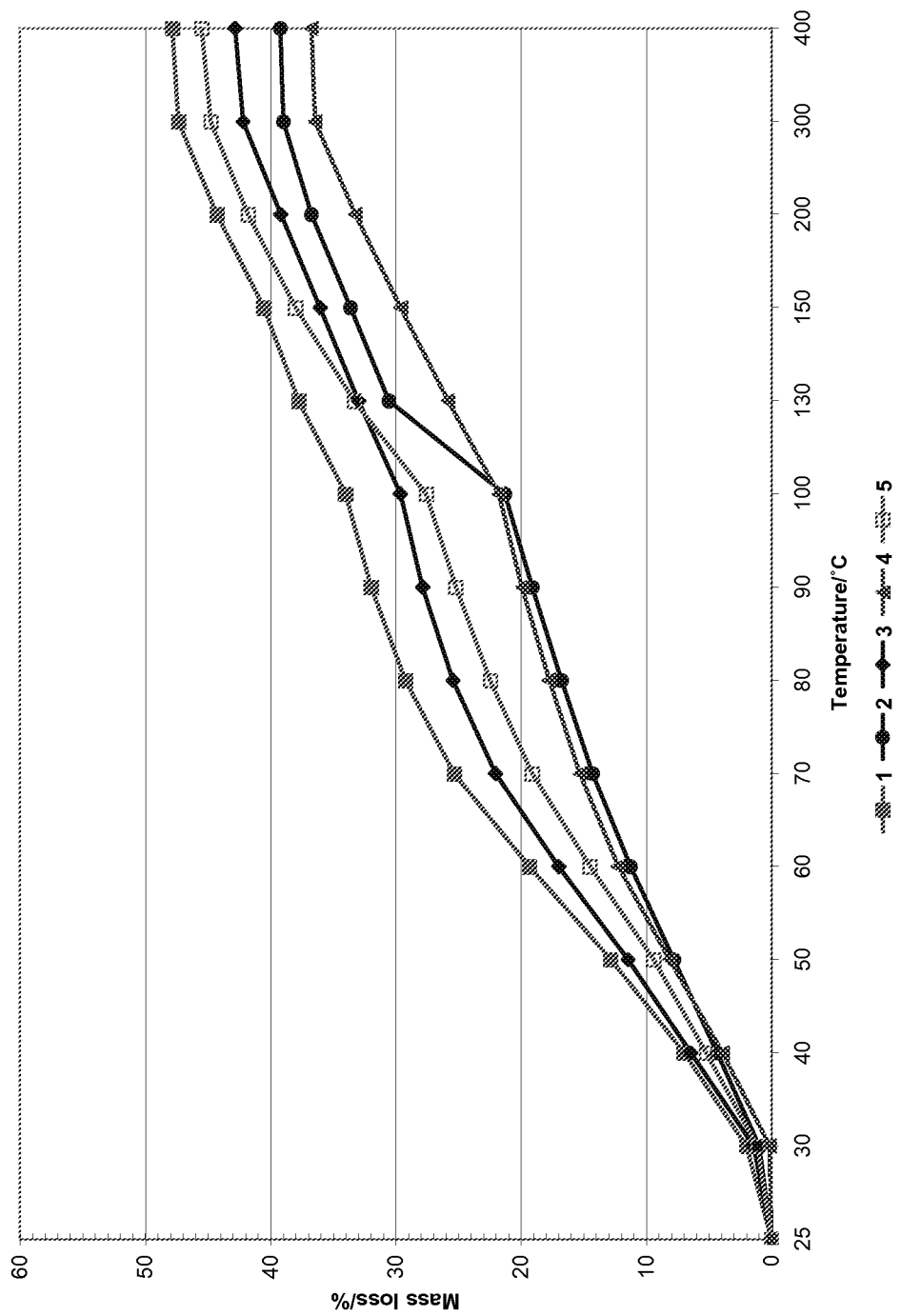
FIG. 5 is a graph illustrating the thermal analysis of various polymers/additives in Potassium silicate solution mixed with silica sol.

Thermal gravimetric analysis was conducted on cured interlayers. FIG. 5 compares the mass loss (rate of water loss) of various organic polymers in Potassium silicate solution mixed with silica sol. The various samples tested were Standard (potassium silicate solution and silica sol only) (plot 1); 0.3% wt sodium L-aspartate monohydrate (plot 2); 0.1% wt polyacrylic acid, sodium salt (MW 5100) (plot 3); 0.3% wt sodium polyaspartate (plot 4); and 0.3% wt D-asparagine (plot 5). All of the samples comprising additives exhibited considerably less mass loss than the Standard sample at a temperature of 400° C. The Sodium polyaspartate sample exhibited the least mass loss. The samples with additives retain water for longer hence controlling the foaming rate and other foam characteristics.

Fire Testing

Figure 6:
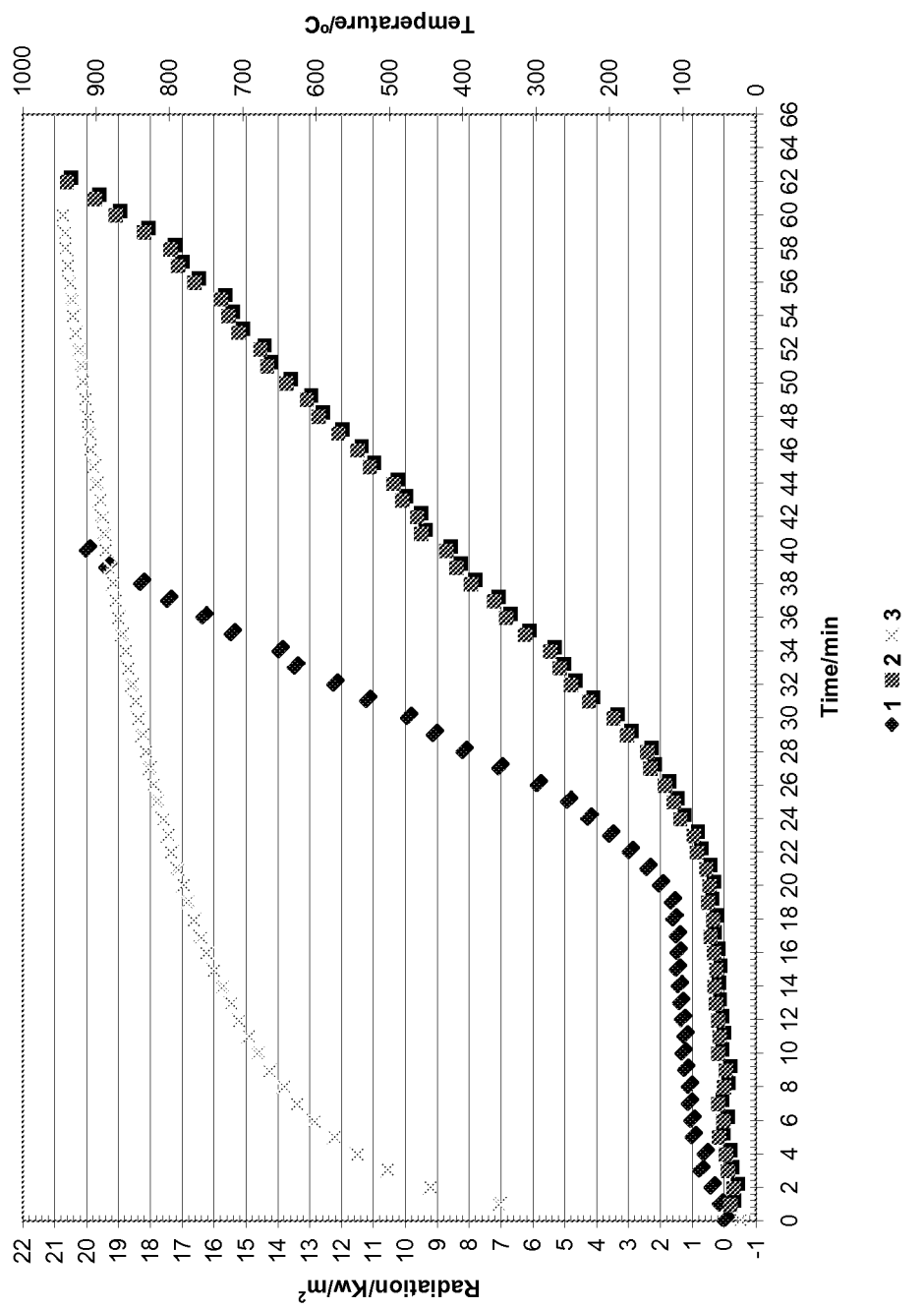
FIG. 6 is a graph illustrating a comparison of transmitted radiant heat with and without additives during a fire test.

FIG. 6 shows the fire tests (comparative thermal radiation transmission data) of the Standard (Potassium silicate solution and silica sol only) (plot 1) and of 0.3% wt Sodium polyaspartate (plot 2), both in a mixture of Potassium silicate solution and silica sol. Plot 3 represents the temperature during the tests. The fire tests of the Standard and of Sodium polyaspartate samples showed significant differences. The Sodium polyaspartate sample has lower transmitted heat radiation ($T_{rad}$) values than the Standard sample. This graph shows that the incorporation of organic polymers into the Potassium silicate solution and silica sol mixture is effective in binding water.

TABLE 8

Water soluble polymers directly added to potassium silicate solution and mixed with silica sol.

| Example No | Additive (Water-soluble polymer/hydrocolloid) | Additive content % | Appearance |
|---|---|---|---|
| 20 | Sodium polyaspartate | 0.1-0.4 | Clear |
| 21 | Poly(acrylic acid) (mwt 2,000) | 0.1 | Clear |
| 22 | Poly(acrylic acid) (30% solution, mwt 100,000) | 0.1-2.0 | Hazy |
| 23 | Poly(acrylic acid) (25% solution, mwt 230,000) | 0.1 | Hazy |
| 24 | Poly(acrylic acid), sodium salt (45% solution, mwt 1,200) | 0.1 | Clear |
| 25 | Poly(acrylic acid), sodium salt (mwt 2,100) | 0.1-0.3 | Clear |
| 26 | Poly(acrylic acid), sodium salt (mwt 5,100) | 0.1 | Clear |
| 27 | Poly(acrylic acid), sodium salt (35% solution, mwt 15,000) | 0.1-5.0 | Hazy |
| 28 | Freeze dried Potassium polyacrylate synthesised from Potassium hydroxide (1M) and Poly(acrylic acid) (mwt 2,000) | 0.1-0.3 | Clear |
| 29 | Freeze dried Potassium polyacrylate synthesised from Potassium hydroxide (1M) and Poly(acrylic acid) (mwt 230,000) | 0.1 | Hazy |
| 30 | Freeze dried Lithium polyacrylate synthesised from Potassium hydroxide (1M) and Poly(acrylic acid) (mwt 2,000) | 0.1 | Clear |
| 31 | Poly(acrylic acid-co-maleic acid) (50% solution, mwt of 3,000) | 0.1-0.3 | Clear |
| 32 | Poly(acrylic acid-co-maleic acid), sodium salt (mwt 50,000) | 0.1 | Clear |
| 33 | Poly(acrylic acid-co-maleic acid), sodium salt (mwt 70,000) | 0.1 | Clear |
| 34 | Poly(diallyldimethylammonium chloride) | 5 | Opaque |
| 35 | Glucopon 215 (Capryl glucoside) | 0.1-10 | Clear but with a top layer of foam |
| 36 | Glucopon 215 and Poly(acrylic acid), sodium salt (mwt of 5,100) blend | 0.1 | Clear but with a top layer of foam |
| 37 | Glucopon 215 with 0.01% Dispelair BS735 (anti-foam agent - emulsion of polydimethyl siloxane) | 0.5 | Clear with no foam (anti-foam agent had collapsed the foam) |
| 38 | PAMAM-OH dendrimer, generation 5 | 0.01 | Clear |

All samples had a water content of ~47% and a molar ratio of $SiO_2:K_2O$ of 4.7.
% contents are given as weight %.

Rheology

Rheology experiments have been conducted on solid samples of CIP interlayers with and without sodium polyaspartate (0.4% wt).

Table 9 shows the viscosity values obtained from the Rheology experiments. It indicates the tendency for 'hydrostatic creep' and it can be seen that the samples with additives are better in this regard.

TABLE 9

Viscosity values of a Standard (Potassium silicate solution and silica sol only) sample and of a sample with the presence of Sodium polyaspartate.

| Additive | Viscosity/Pa · s |
| --- | --- |
| Standard | 6.50E+06 |
| Sodium polyaspartate | 8.00E+06 |

Figure 7:
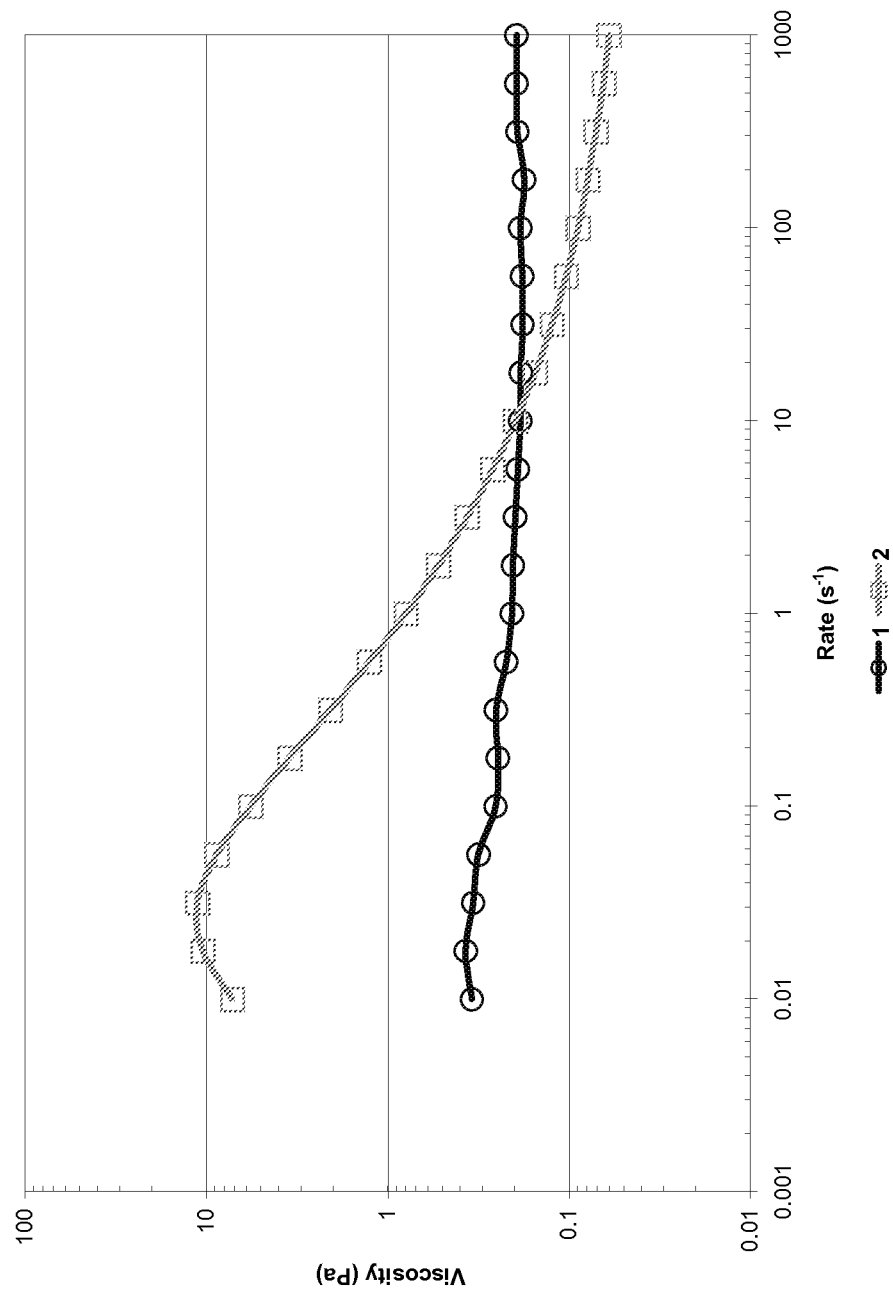
FIG. 7 is a graph illustrating the viscosity of Standard (Potassium silicate solution and silica sol only) and of Sodium polyaspartate in potassium silicate solution mixed with silica sol.

FIG. 7 shows the viscosity of Standard (Potassium silicate solution and silica sol only) (plot 1) and of 0.3% wt Sodium polyaspartate in Potassium silicate solution mixed with silica sol (plot 2). It can be seen that the presence of Sodium polyaspartate had made a big difference in the viscosity compared to the Standard. The viscosity in the presence of Sodium polyaspartate is much higher than the Standard, indicating that the Sodium polyaspartate sample has more structure compared to the Standard sample and will be able to bind water more effectively.

The invention claimed is:

1. A transparent fire resistant glazing comprising an intumescent interlayer sandwiched between two opposed glass panes, wherein the intumescent interlayer comprises an alkali metal silicate mixed with a foam improvement additive, wherein the foam improvement additive comprises a polymer and/or oligomer and/or salts thereof, wherein said polymer, oligomer and/or salts thereof each contain at least one organic moiety having at least one hydrogen-bondable functional group covalently attached thereto, and wherein the additive is polymerised in-situ.

2. The fire resistant glazing as claimed in claim 1, wherein the additive comprises a polymer network extending through a portion of the interlayer.

3. The fire resistant glazing as claimed in claim 1, wherein the additive is selected from the group consisting of dextran, poly(vinyl alcohol), poly(ethylene glycol), gum arabic, carboxymethyl cellulose, poly(acrylic acid), poly(acrylic acid) sodium salt, poly(acrylic acid) potassium salt, poly(acrylic acid) lithium salt, poly(acrylic acid-co-maleic acid), poly(acrylic acid-co-maleic acid) sodium salt, polymethacrylic acid, polymethacrylamide, polyaspartate, alkyl polyglucoside, polyasparagine and their derivatives.

4. The fire resistant glazing as claimed in claim 1, wherein the additive is a hydrophilic polymer.

5. The fire resistant glazing as claimed in claim 1, wherein the additive is substantially soluble in water.

6. The fire resistant glazing as claimed in claim 1, wherein the polymerisation of the additive is thermally initiated.

7. The fire resistant glazing as claimed in claim 1, wherein polymerisation of the additive comprises polymerisation of at least one precursor of formula

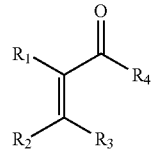

wherein:
$R_1$ and $R_2$, $R_2$ and $R_3$ or $R_3$ and $R_4$ together with the carbons to which they are attached form a 5, 6, 7 or 8 membered rings; and/or
$R_1$, $R_2$, $R_3$ and $R_4$ are independently selected from hydrogen, halo, pseudohalo, substituted or unsubstituted hydrocarbyl, substituted or unsubstituted heterohydrocarbyl, $OR_5$, $NH_2$, $COOR_5$, ONa, $ONH_4$, OK, OLi or SH wherein $R_5$ is H, substituted or unsubstituted hydrocarbyl.

8. The fire resistant glazing as claimed in claim 7, wherein polymerisation of the additive comprises polymerisation of at least one precursor of formula

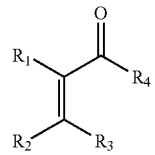

wherein $R_2$ and $R_3$ are not simultaneously OH, ONa, OK, OLi, $NR'_n$ (R' is H, substituted or unsubstituted hydrocarbyl), $NH_2$ or SH or any combination of these groups.

9. The fire resistant glazing as claimed in claim 7, wherein the precursor is a (meth)acrylate or a (meth)acrylamide.

10. The fire resistant glazing as claimed in claim 7, wherein the precursor is selected from sodium(meth)acrylate, potassium(meth)acrylate, ammonium(meth)acrylate, (meth)acrylic acid, itaconic acid, maleic acid, (meth)acrylic acid, maleic acid coprecursor, glycerol 1,3-diglycerolate di(meth)acrylate, diurethane di(meth)acrylate, 3-(Acryloyloxy)-2-hydroxypropyl(meth)acrylate, and N,N'-(1,2)-dihydroxyethylene)-bis(meth)acrylamide.

11. The fire resistant glazing as claimed in claim 7, wherein the additive is polymerised from a mixture of precursors.

12. The fire resistant glazing as claimed in claim 1, wherein the alkali metal silicate comprises sodium silicate, and wherein the sodium silicate has a molar ratio $SiO_2:Na_2O$ of 2.0:1 to 4.0:1.

13. The fire resistant glazing as claimed in claim 1, wherein the alkali metal silicate comprises potassium silicate, and wherein the potassium silicate has a molar ratio $SiO_2:K_2O$ from 1.4:1 to 2.0:1.

14. The fire resistant glazing as claimed in claim 1, wherein the content of additive is less than 5% by weight.

15. The fire resistant glazing as claimed in claim 14, wherein the content of additive is less than 0.5% by weight.

16. A process for the production of transparent fire resistant glazing, the process comprising,
a) providing two opposed glass panes,
b) providing an aqueous solution of an alkali metal silicate and at least one foam improvement additive between and in contact with the two opposed glass panes, and
c) polymerising the foam improvement additive in-situ to form a polymer and/or oligomer and/or salts thereof, wherein said polymer, oligomer and/or salts thereof each contain at least one organic moiety having at least one hydrogen-bondable functional group covalently attached thereto.

17. The fire resistant glazing as claimed in claim 1, wherein the interlayer has a total water content in the range of 20 to 60% by weight.

* * * * *